United States Patent [19]

Hermansson

[11] 4,159,982

[45] Jul. 3, 1979

[54] PROTEIN/STARCH COMPLEX

[76] Inventor: Anne-Marie I. Hermansson, S-416 60 Göteborg, Sweden

[21] Appl. No.: 893,412

[22] Filed: Apr. 4, 1978

[51] Int. Cl.² .............................................. A23J 1/20
[52] U.S. Cl. .................................... 260/119; 426/657
[58] Field of Search ........................................ 260/119

[56] References Cited

U.S. PATENT DOCUMENTS 3,764,711  10/1973  Melnychyn et al. ............ 260/119 X
3,865,959  2/1975  Lecluse .............................. 260/119 X

*Primary Examiner*—Walter C. Danison
*Attorney, Agent, or Firm*—Berman, Aisenberg & Platt

[57] ABSTRACT

By heating starch with an aqueous dispersion of casein or caseinate at a temperature above the gelation temperature of the starch, a unique complex is formed.

20 Claims, 11 Drawing Figures

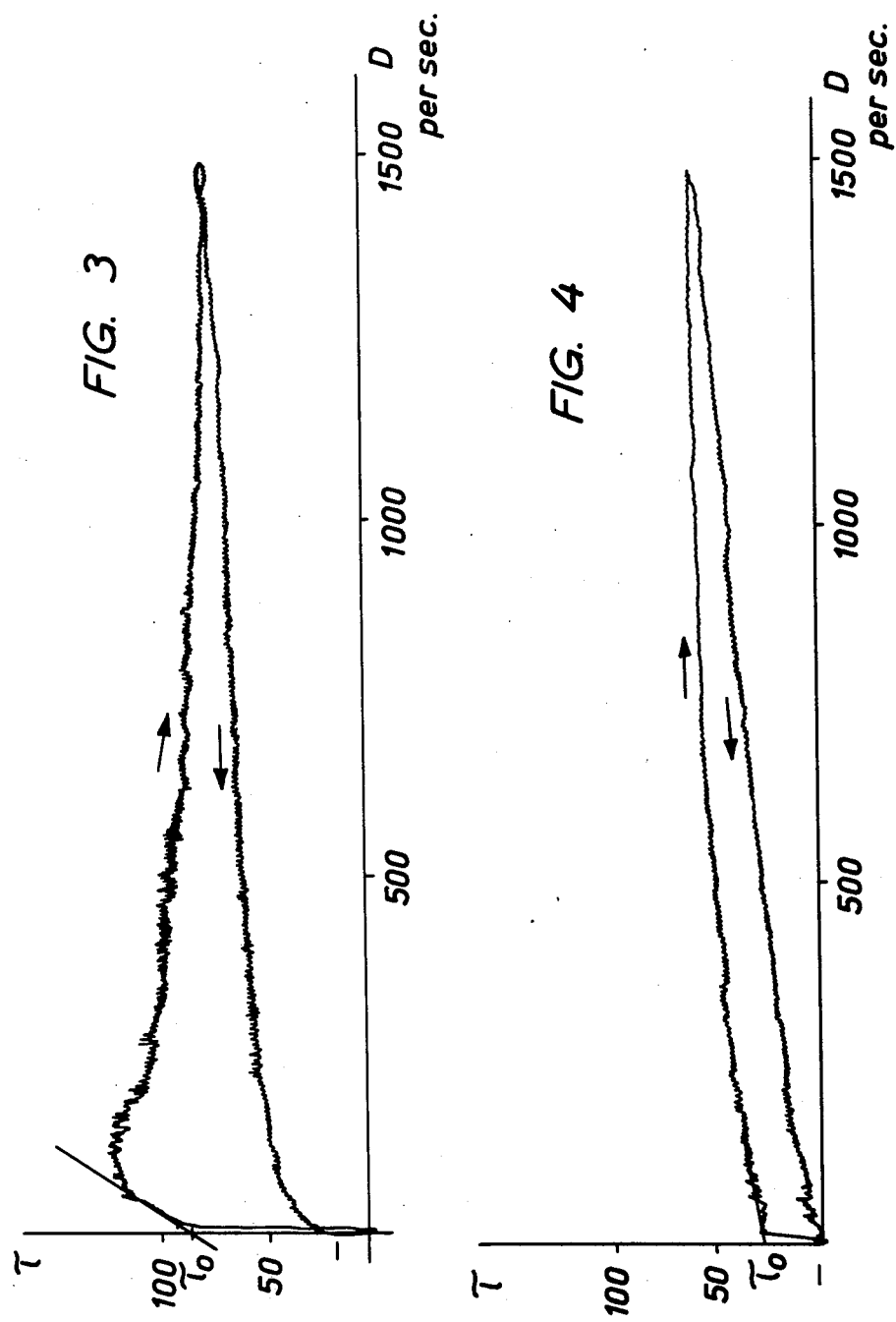

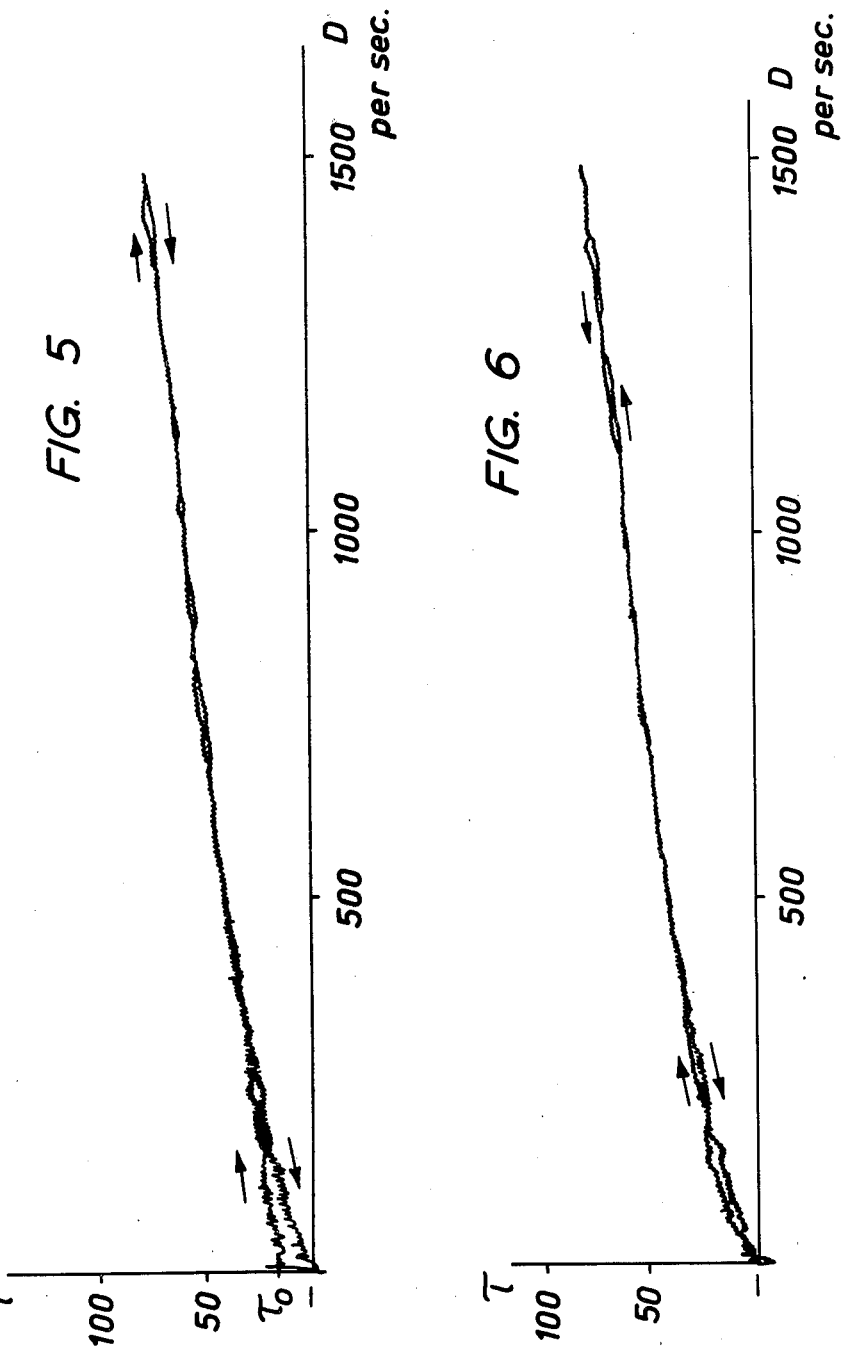

PROTEIN/STARCH COMPLEX

BACKGROUND

When foodstuffs or foodstuff components are combined, the raw materials are destroyed and protein, carbohydrate, fat and spices recombine to form different products. Proteins and carbohydrates are used for their traditional functions. The most common carbohydrate for human consumption is starch, which is used as a thickener and as a binder in several foodstuffs. It lacks certain functional properties, such as foam and emulsion-stabilizing properties, and is limited in its utility.

Physical and chemical modification of starch has been effected to modify its properties.

Starch combines with gluten to provide a product having the properties of bread. Starch is used to improve the properties of skim milk. According to Swedish patent specification No. 129,026, starch increases milk-protein foam stability. The amount and ratio of starch used for these purposes and the fact that the same effects are obtained with such substances as pulverized fruit seeds, pips and stones, kefir, kefir casein and lecithin indicate that the normal binding properties of the starch are being utilized to obtain the desired effect. In order to utilize the properties of milk protein, this must also be swollen by increasing the pH value.

According to Norwegian patent specification No. 67,483, starch is used in the production of a dry-milk protein product. From the process conditions and weight ratios of ingredients it is appreciated that normal swelling properties of the starch are responsible for improving the properties of the milk protein. A gelatinized starch product is referred to. Souring of the milk seems to be a prerequisite for preparing the actual milk protein product.

SUMMARY OF THE INVENTION

Modified starch products are prepared by binding starch from virtually any source with protein (casein or caseinate) to form complexes. Such complexes are prepared by heating starch with an aqueous dispersion of the protein at a temperature in excess of the starch-gelation temperature. The reaction time is naturally dependent upon the actual temperature employed and, to some extent, on the concentration and relative concentrations of reactants. The reaction time is ordinarily from less than 1 minute to about 45 minutes and may even be extended further.

The modified starch is useful in substantially the same way as unmodified starch, but does not have the stickiness and gumminess properties of starch. In addition, it is useful for emulsion stabilization. The modified starch can further be prepared to various viscosities.

BRIEF DESCRIPTION OF THE DRAWINGS

FIGS. 3 to 6 graphically depict the relation between shearing force and shearing speed.

DETAILS

Figure 1:
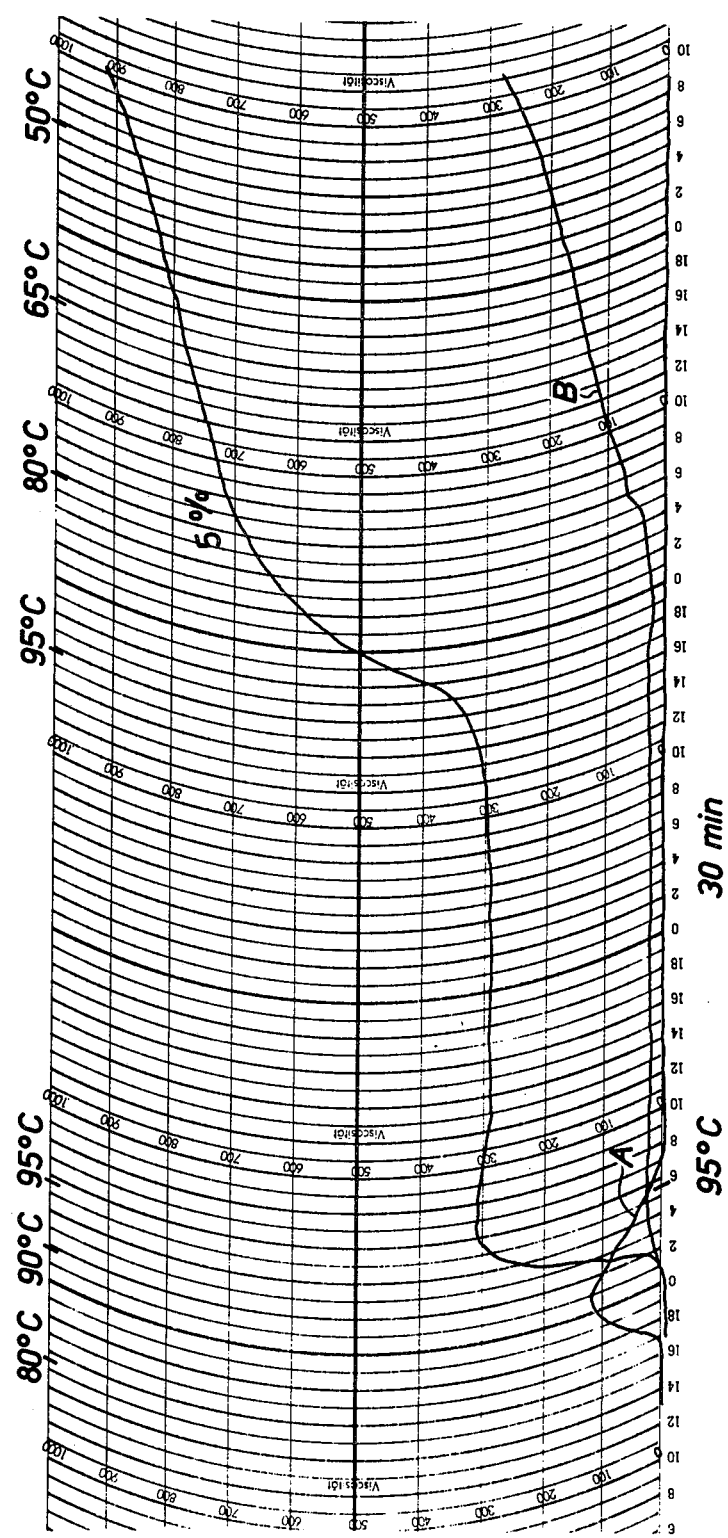
FIGS. 1 and 2 graphically depict the relation between viscosity and temperature.

Characteristics of the protein/starch complex are dependent upon the degree of complex formation and thus upon the ratio of protein to starch, reaction time, reaction temperature and ions in the reaction mixture. The nature of the modified starch is virtually independent of the form of casein and of the source of starch employed. Naturally, the modified starch retains basic properties of the starch which is modified, but the nature of the modification is substantially the same for each starch used. The reaction is also substantially independent of pH.

Increasing the protein from virtually none to at least an amount (by weight) equal to that of starch decreases the thixotropy of the resulting modified starch and its ability to gel. By including ions (preferably polyvalent anions) in the reaction mixture, the ability to gel can be eliminated.

Although the reaction temperature must be at least that of the gelation temperature of the starch, the reaction is suitably conducted at any temperature from that lower limit.

The reaction time is ordinarily from less than 1 minute to about 45 minutes and is dependent upon the reaction temperature. At lower temperatures the reaction time can be extended to an hour or even longer without any deleterious effect.

By varying the noted critical reaction parameters, the degree of complex formation and the functional properties of the resulting modified starch are controlled. The modification makes it possible to use starch in ways and for purposes not previously possible, particularly where swelling, gelation and thixotropy were limiting or preclusionary factors. As compared with properties of employed starch, the complex is devoid of thickening and gelation properties or has these properties only to a significantly-reduced extent. The ability of the starch to thicken and/or gel is altered by rupturing starch grains and forming aggregates under the noted reaction conditions. When the complex (rather than unmodified starch) is admixed with other material, the composite total solids may be increased by more than 100 percent, even though the viscosity of the admixture is concurrently drastically decreased and no gelation occurs. Such a result is extremely important for products which must be sterilized and for semi-fluid products, such as baby food, wherein bulk is a problem.

The consistency of the protein/starch complex differs from that of the starch from which it was prepared; it is less sticky and less gummy. The extent to which these particular properties are changed is controlled by varying the previously-noted critical factors. Generally, increasing the proportion of protein, introducing ions into the reaction mixture or increasing the amount of such ions, and increasing the reaction time or temperature reduce the stickiness and gummy nature of compositions otherwise containing modified starch. With these properties thus altered, the protein/starch complex is more-easily used in different semi-solid products, such as meat and fish products. By controlling stickiness, the modified starch is more useful (e.g., for pasting particles together) in those instances where unmodified starch normally provides a consistency which is too gummy.

The flow properties of the protein/starch complex are significantly different from those of, e.g., cold-swelling starch. The degree of thixotropy and elasticity is materially reduced or entirely eliminated by altering reaction conditions in the same manner as suggested in the preceding paragraph.

The present modification of starch does not only reduce or eliminate undesirable properties; it also introduces desirable properties in the obtained product. The complex is thus useful for emulsion stabilization, a utility not possessed by cold-swelling starch.

As the modified starch does not have any residual flavor of its own, it does not alter the taste of food products with or in which it is used.

All properties of the protein/starch complex are controllable by varying process parameters, such as the ratio of protein to starch, the reaction time and the reaction temperature, and incorporating salt in the reaction mixture.

The protein employed is a casein or caseinate. The protein is optionally casein or a caseinate, such as ammonium caseinate, calcium caseinate or sodium caseinate. Alternatively, the protein is, e.g., in the form of paracasein, acid-precipitated casein or self-soured casein. The properties of the protein/starch complex are substantially independent of the nature of the employed form of casein.

Although starches vary in molecular structure and in properties, depending upon their botanical origin, they all have fundamental common properties which are similarly modified by the present invention, which is thus substantially independent of the source of starch employed. The starch can thus be that of arrowroot, barley, bean, buckwheat, cassava (tapioca), corn, oat, pea, potato, rice, rye, sago, sorghum, waxy maize and-/or wheat. Naturally-occurring starch is separated from different parts of plants. Starch from corn, wheat, sorghum and rice is separated from the seed; that from cassava, potato and arrowroot is separated from the root; and that from sago is separated the stem. The manner in which the starch is thus separated is conventional and well known; it does not constitute a part of this invention. Although the amylose/amylopectin ratio may vary from starch to starch, such is not a critical factor with regard to this invention.

Since the degree of swelling varies substantially from starch to starch, the maximum starch concentration in any admixture may well depend upon the source or origin of the starch. Of the three most common types of starch, the order of precedence with regard to concentration is wheat starch > corn starch > potato starch.

Figure 8:
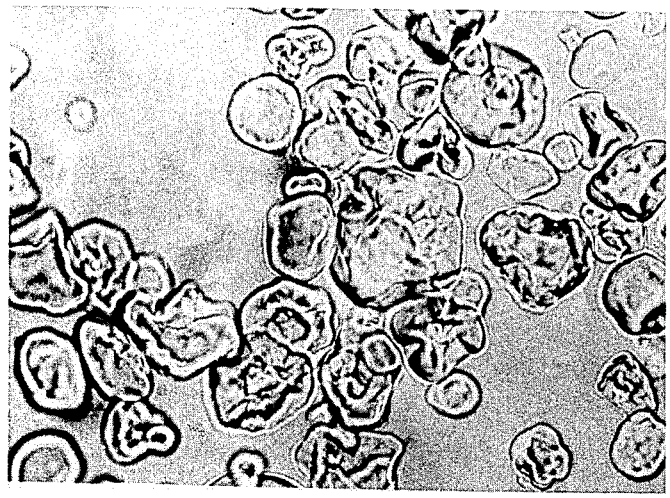
FIG. 8 is a micrograph showing swelled corn starch granules at 95° C. in 0.2 M NaCl.
Figure 9:
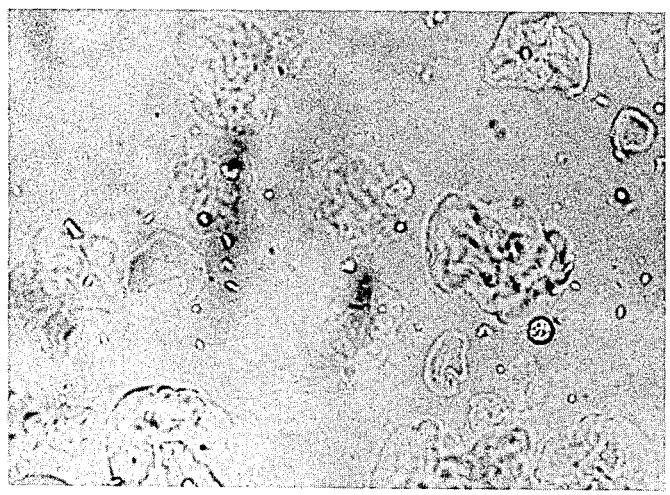
FIG. 9 is a micrograph showing starch protein complexes and emptied granules when corn-starch and caseinate were heated to 95° C. in 0.2 M NaCl.

The present modification of starch is predicated on a specific action on starch granules and has no relationship or relevance to other swelling or foaming agents. When native starch granules are heated, they lose their birefringent properties and start to swell. Water penetrates into the granules, and solubilized amylose and amylopectin diffuse out into the solution. There will be an equilibrium between solubilized amylose and amylopectin inside and outside the granules. The swelled starch granules can be seen in FIG. 8, showing swelled corn starch granules at 95° C. When casein or caseinate is added, the protein forms complexes with the starch components. The complexes make up particles of various sizes which are seen in the micrograph of FIG. 9. When an insoluble (but colloidally-stable) particle of starch-caseinate complex is formed, the equilibrium between soluble starch components inside and outside the granule is affected. This means that more soluble starch components will leave the granule and, when the reaction is permitted to proceed far enough, the granules are completely emptied. Such a case is illustrated in the micrograph of FIG. 9, where some granules appear as emptied ghosts. The complex is thus best identified by microscopy. For large complexes light microscopic methods are sufficient. For small complexes electron microscopy may be necessary. FIGS. 8 and 9 are examples of light micrographs. The degree of complex formation can be controlled and thereby the physical properties of the starch granules. Properties like viscosity, stickiness and gumminess can be changed. By controlling the complex formation, properties induced by the formed complexes can be "tailored" and controlled. The complex formation induces properties, such as emulsion stabilization of animal fat, important to meat products. By controlling the interactions between starch granules, solubilized starch and complexes (particles), various types of textures can be created. The forces involved are electrostatic forces, hydrophobic bonds, hydrogen bonds and van der Waal's attraction forces. The complex formation starts immediately as swelling of the starch granules takes place. The number and size of complexes increase with time.

The formed complex is produced over a wide pH range, e.g. from a pH of about 2 to a pH of about 12. No particular increase in pH is required during the reaction. By using milk-free casein, gelation of starch, e.g., can be completely inhibited. This is not possible when casein or caseinate is employed as a component in milk or with milk powder.

Although the casein or caseinate need not necessarily be in pure form or separated from other ingredients, there are certain ingredients, such as lactose, which impede complex formation. Effecting complex formation in the absence of such inhibiting ingredients is naturally advantageous and is effected in conventional equipment according to recognized procedures. Process equipment employed for producing cold-swelling starch is useful for this purpose. After complex formation, with or without mono- or poly-valent salt, the resulting modified starch is dried and sold in powder form. Mixing, heating and drying are the three necessary unit operations. An additional unit process may be required when the dry product is to be given a texture. Conventional texturizing processes, such as extrusion or spinning, can be used.

The mixing and heating can take place in the same system, e.g. in a heat exchanger Contherm (trade mark) from Alfa-Laval AB, Sweden. In this case the temperature should not exceed the boiling temperature. Another possibility is that heating and drying takes place simultaneously, e.g., in a roll dryer. The upper temperature limit can then exceed that of the boiling temperature. The lower limit in both cases is the gelation temperature when native starch granules are used. At the gelation temperature the heat causes swelling and breakdown of the crystalline regions of the starch granules. When the starch granules are damaged, e.g., by mechanical treatment and some of the crystalline regions are already broken, a lower temperature may be sufficient. The amount of energy required for breakdown depends on the pre-history of the starch granules and the conditions under which they are broken down. The examples given all refer to experiments on starches having most of the granules undamaged (native starch). The starch-gelation temperature, usually from 60° to 85° C., is the temperature at which the starch loses its birefringence properties.

As soon as amylose and amylopectin collide with a caseinate molecule, the complex formation starts. With time the number and size of the particles will increase. The time/temperature relation will therefore determine the properties of the formed complexes as well as the properties of the modified starch granules. With increasing time and temperature the identity of the original starch granules is gradually lost. In order to keep the cost of processing low, the dry content should be kept as high as the processing equipment permits. Theoretically there is no lower limit. The water content must be high enough for swelling and diffusion of macromolecules. Under realistic conditions the dry content should be from 8 to 30%. The higher the dry content, the higher the viscosity and the more difficult the handling. The dry content will influence the reaction time necessary to obtain certain properties.

The protein/starch ratio can be from 1:20 to 4:1, but from 1:16 to 4:3 is most desirable.

The pH can be from about 2 to 4 and from 5 to 10. Close to its isoelectric point, around pH 4.5, casein has low solubility. For practical purposes a pH of from 5.5 to 8.0 is recommended.

For monovalent ions salt concentrations of 0–0.6 M are recommended; for polyvalent ions concentrations of 0–0.3 M are recommended.

The ratio of casein/caseinate to starch has a considerable effect on the properties of the product. For the several properties different optima apply.

When it is desired to avoid gelation and thickening, the greatest possible portion of the starch should be formed into complexes. In that case, the casein/caseinate concentration should be relatively high. The addition of salt promotes the complex formation, and gelation is avoided completely only in the presence of salt. Good effects as far as a decrease of the viscosity is concerned have been obtained at a ratio of casein/caseinate to starch ranging from 1:4 to 4:3.

The stickiness is largest for untreated starch and decreases with increasing degree of complex formation. The stickiness decreases with increasing addition of casein/caseinate and increasing addition of salt. Optimum conditions are entirely dependent on the product wherein the starch is to be used. Thanks to good control possibilities, starch products having different degrees of stickiness can be "tailored" for different fields of demand.

As already noted, the incorporation of salt in the reaction medium has a positive effect on complex formation and thus on properties of the resulting modified starch. Optimum conditions for complex formation include salt in the reaction medium. The effect of salt is not limited to any one or group of salts but is obtained with different salts. The largest effect is obtained when the reactants (casein or caseinate and starch) are in contact with polyvalent ions during reaction. Under such conditions, considerably lower concentrations of salt (polyvalent-ion-containing salt) are required than, e.g., for NaCl. The greater the salt effect, the lower the thixotropy and the elasticity component of the final product. Complexes are also formed in the absence of salt, but the reaction equilibrium is not so heavily displaced towards complex formation, which is advantageous in some applications. The complex formation is not dependent on pH within ranges of interest in foodstuff technology.

The discussion has so far referred to applications wherein it is of interest to reduce the viscosity. For use in meat products such reduction is not a requirement. For this application the complex formation should proceed far enough for new functional properties to occur and far enough to reduce the gumminess of the final product, but the viscosity should not be decreased too much. The new functional property that is created is "emulsion stability" of the fat used. Such a product can e.g., be created when the starch/casein ratio is from 8:1 to 4:1 and when the complex is formed in the presence of 0.2 M NaCl or in the absence of salt.

The application of starch products modified by complex formation with casein or caseinate can be summarized as follows:

Sausages, such as frankfurters: The modified starch gives good water and fat holding properties. There are good possibilities to "tailor" the consistency of the final products.

Minced meat products: The modified starch can be used in order to paste particles together; this facilitates the formation of minced meat products. The consistency is improved compared to unmodified starch.

Half-solid and liquid products, such as soups, sauces, yogurt, dressings, ketchup, baby food, and porridges: The viscosity can be controlled. The modified starch can be frozen and, due to the complex formation, the degree of retrogradation is substantially decreased.

Replacers for eggwhite in such products as toppings, meat products and bread: Functional properties can be created compatible with those of eggwhite.

Exemplary embodiments of the invention follow. The examples are presented solely for the purpose of illustration and in no way limit the nature or scope of the invention. In the examples all temperatures are in degrees Centigrade, and all parts are parts by weight unless otherwise specified.

EXAMPLE 1

Disperse 4 parts of caseinate in 100 parts by volume of a 0.1 M phosphate buffer solution having a pH of 7.0 (neutral pH value), and then add 4 parts of corn-starch to the thus-obtained dispersion to form a reaction medium. Heat the reaction medium in a Brabender Viscograph from ambient temperature to 95° at a rate of 1.5° per minute. Maintain the temperature of the reaction medium constant at 95° for 30 minutes, and then cool the reaction medium to approximately ambient temperature at a rate of 1.5° per minute.

Conduct the preceding steps separately with each of two different caseinates: Sodium caseinate Sodinol (trade mark) from A/S Lidano, Denmark, and sodium caseinate from DMV, Holland Dry and grind the resulting starch according to conventional procedures used for starch.

Repeat the entire preceding procedure without any caseinate in the phosphate buffer.

FIG. 1 provides a comparison between the viscosity at different temperatures of the aqueous starch composition which was not reacted with caseinate, that which was reacted with Sodinol (A) and that which was reacted with sodium caseinate from DMV (B). Both curve A and curve B illustrate significant reductions in viscosity at the different temperatures noted. FIG. 1 further shows that the viscosity decreased substantially at the addition of each type of caseinate. With the caseinate from Lidano, gelation was entirely eliminated, and swelling ceased after a very short initial period. With the caseinate from DMV the resulting modified starch failed to form any gel and reflected materially-reduced swelling.

EXAMPLE 2

Effect two separate reactions, each in 100 parts by volume of a 0.1 M phosphate buffer, according to the procedure of Example 1 (except as otherwise indicated), one with one part and the other with 4 parts of caseinate from DMV and both with a reaction-mixture pH of 5.5. (The specified conditions simulate those which prevail in a meat system.) Maintain the pH constant at 5.5 and heat only to 70°. Maintain the temperature at this level for 30 minutes before cooling.

Repeat the procedure without any caseinate in the reaction mixture.

Figure 2:
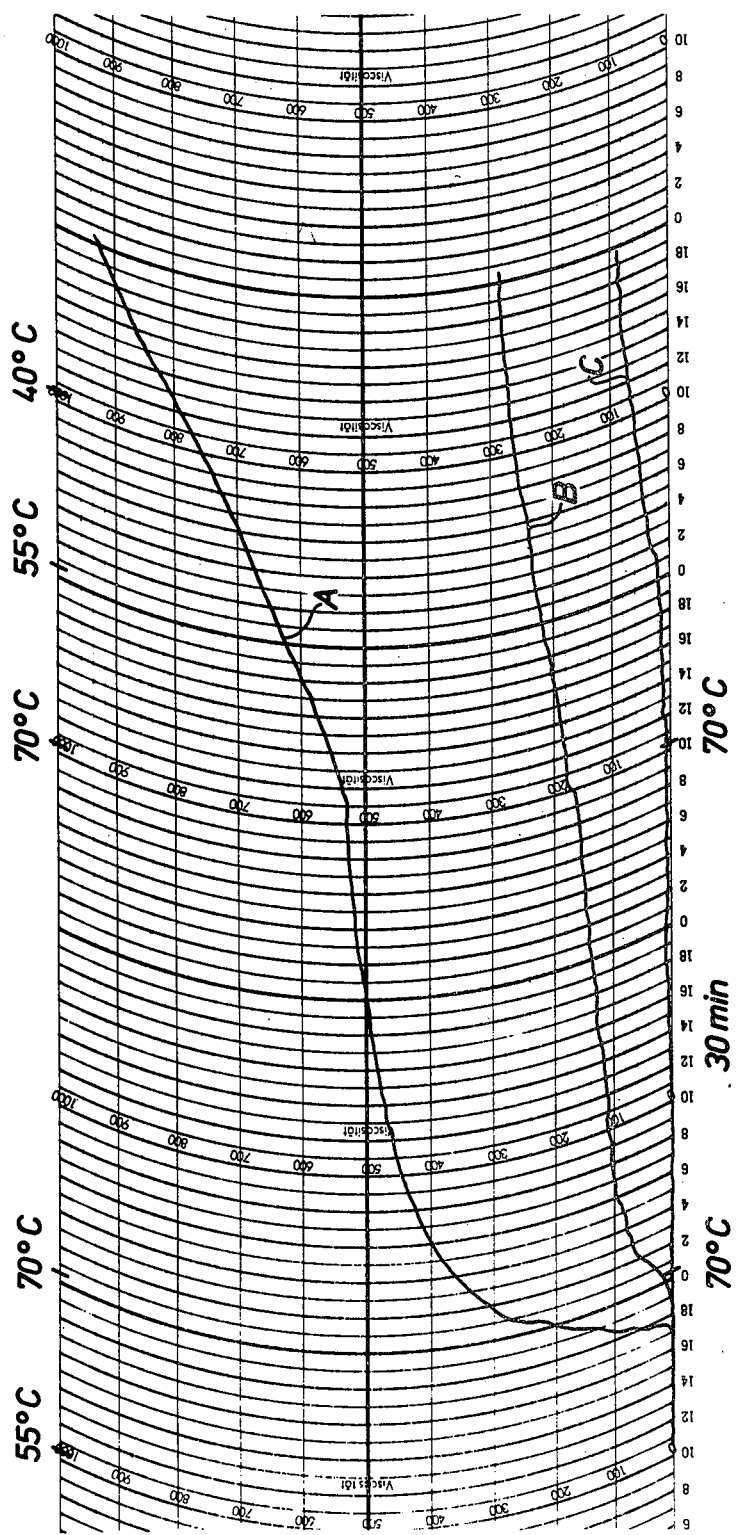

FIG. 2 reflects the viscosity/temperature relationship throughout the preceding procedure for preparing the comparative product A with zero percent caseinate, the reaction product B with one percent caseinate and the reaction product C with four percent caseinate. FIG. 2 confirms the material decrease in viscosity with increased caseinate concentration. Swelling and viscosity are very much reduced when the reaction mixture contains 4 percent by weight of caseinate, i.e. when the total solids of the employed starch are increased by 100 percent by weight, as shown by curve C.

EXAMPLE 3

Following the procedure of Example 1, prepare a corresponding product with 5 parts of pure corn-starch in 100 parts by volume of distilled water (no casein or caseinate and no other additive). Dry and grind the resulting product according to conventional procedures employed for starch.

EXAMPLE 4

Following the general procedure of Example 1, react 5 parts of corn-starch with 4 parts of caseinate (from DMV) dispersed in 100 parts by volume of distilled water (no additive). Dry and grind thus-obtained modified starch according to conventional procedures used for starch.

EXAMPLE 5

Following the procedure of Example 1, react 5 parts of corn-starch with 4 parts of caseinate (from DMV) in 100 parts by volume of an aqueous 0.2 M NaCl solution. Dry and grind the resulting modified starch according to procedures conventional for starch.

EXAMPLE 6

Following the procedure of Example 1, react 5 parts of corn-starch with 4 parts of caseinate (from DMV) dispersed in 100 parts by volume of universal buffer (containing phosphate and citrate ions, see Example 13) at a pH of 7. Dry and grind the resulting modified starch according to procedures conventional for starch.

Examples 3 to 6 are directed to producing products differing in degree of complexing, stickiness and thixotropy. The degree of thixotropy can be measured, as can the degree of gel structure, but to a lesser extent. Stickiness must be estimated by sensory evaluation and is correlated to the other noted properties. This group of examples reflects the effect on starch of casein or caseinate alone, with a salt, and with polyvalent anions.

FIGS. 3 to 6 represent the relationship of shearing force (vertical axis) to shearing rate (horizontal axis) for products prepared according to Examples 3 to 6, respectively. The area between the upper and the lower curves in each of these figures is a measure of thixotropy (gelation). The measurements were made in a Haake Rotovisko, Model RV3 (Gebruder Haake K.G.) with a MVI measuring system. During the measurement the temperature was kept constant at 37° C. The shearing force is represented by $\tau$, and the shearing rate is represented by D. $\tau_0$ is the force necessary to put the system into motion. The greater the thixotropy and $\tau_0$, the stronger the gel structure in systems of this type.

FIG. 3 presents the flow curve for corn-starch treated without any additive. A high $\tau_0$ prevails, and the thixotropy is great. Moreover, there is a clear maximum in shearing force, which means that the structure is broken down at shearing.

When 4 percent caseinate is added (Example 4) and the solids content is thus increased by 80 percent, both $\tau_0$ and thixotropy decrease, as shown by FIG. 4. No maximum in shearing force is observed. When the reaction is effected in the presence of 0.2 M NaCl solution (Example 5), thixotropy and $\tau_0$ decrease substantially, as shown in FIG. 5. In the presence of polyvalent ions (Example 6), the obtained product reflects no sign of gel structure; neither $\tau_0$ nor thixotropy is evident from FIG. 6.

EXAMPLE 7

Disperse 0.5 part of sodium caseinate in 100 parts by volume of 0.2 M calcium sulfite (aq) solution having a pH of 9, and then add 8 parts of wheat starch to the thus-obtained dispersion to form a reaction medium. Heat the reaction medium in a Brabender Viscograph from ambient temperature to 85° at a rate of 1.5° per minute. Maintain the temperature of the reaction medium constant at 85° for 45 minutes, and then cool the reaction medium to approximately ambient temperature at a rate of 1.5° per minute. Stir the reaction medium throughout the preceding procedure to maintain all solids dispersed throughout the aqueous medium.

Dry and grind the resulting modified starch (starch complex) according to conventional procedures used for starch.

EXAMPLE 8

Disperse 9 parts of calcium caseinate in 100 parts by volume of 0.1 M calcium tartrate (aq) solution having a pH of 8, and then add 6 parts of tapioca to the thus-obtained dispersion to form a reaction medium. Heat the reaction medium in a Brabender Viscograph from ambient temperature to 90° at a rate of 1.5° per minute. Maintain the temperature of the reaction medium at 90° for 25 minutes, and then cool the reaction medium to approximately ambient temperature at a rate of 1.5° per minute. Stir the reaction medium throughout the preceding procedure to maintain all solids dispersed throughout the aqueous medium.

Dry and grind the resulting modified starch (starch complex) according to conventional procedures used for starch.

EXAMPLE 9

Disperse 2 parts of acid-precipitated casein in 100 parts by volume of 0.5 M NaCl (aq) solution having a pH of 6, and then add 4 parts of rice starch to the thus-obtained dispersion to form a reaction medium. Heat the reaction medium in a Brabender Viscograph from ambient temperature to 85° at a rate of 1.5° per minute.

Maintain the temperature of the reaction medium constant at 85° for 35 minutes, and then cool the reaction medium to approximately ambient temperature at a rate of 1.5° per minute. Stir the reaction medium throughout the preceding procedure to maintain all solids dispersed throughout the aqueous medium.

Dry and grind the resulting modified starch (starch complex) according to conventional procedures used for starch.

EXAMPLE 10

Disperse 4 parts of self-soured caseinate in 100 parts by volume of 0.1 M calcium citrate (aq) solution having a pH of 5, and then add 3 parts of sago starch to the thus-obtained dispersion to form a reaction medium. Heat the reaction medium in a Brabender Viscograph from ambient temperature to 90° at a rate of 1.5° per minute. Maintain the temperature of the reaction medium constant at 90° for 20 minutes, and then cool the reaction medium to approximately ambient temperature at a rate of 1.5° per minute. Stir the reaction medium throughout the preceding procedure to maintain all solids dispersed throughout the aqueous medium.

Dry and grind the resulting modified starch (starch complex) according to conventional procedures used for starch.

EXAMPLE 11

Following the procedure of Example 1, add 4 parts by weight of potato starch separately to each of the following:
(a) 100 parts by volume of distilled water;
(b) a dispersion of 6 parts by weight of milk powder in 100 parts by volume of distilled water;
(c) a dispersion of 8 parts by weight of milk powder in 100 parts by volume of distilled water;
(d) a dispersion of 10 parts by weight of milk powder in 100 parts by volume of distilled water;
(e) a dispersion of 12 parts by weight of milk powder in 100 parts by volume of distilled water.

Heat each reaction medium (a) through (e), maintain its maximum temperature for the prescribed period and then cool it as specified in Example 1.

Figure 7:
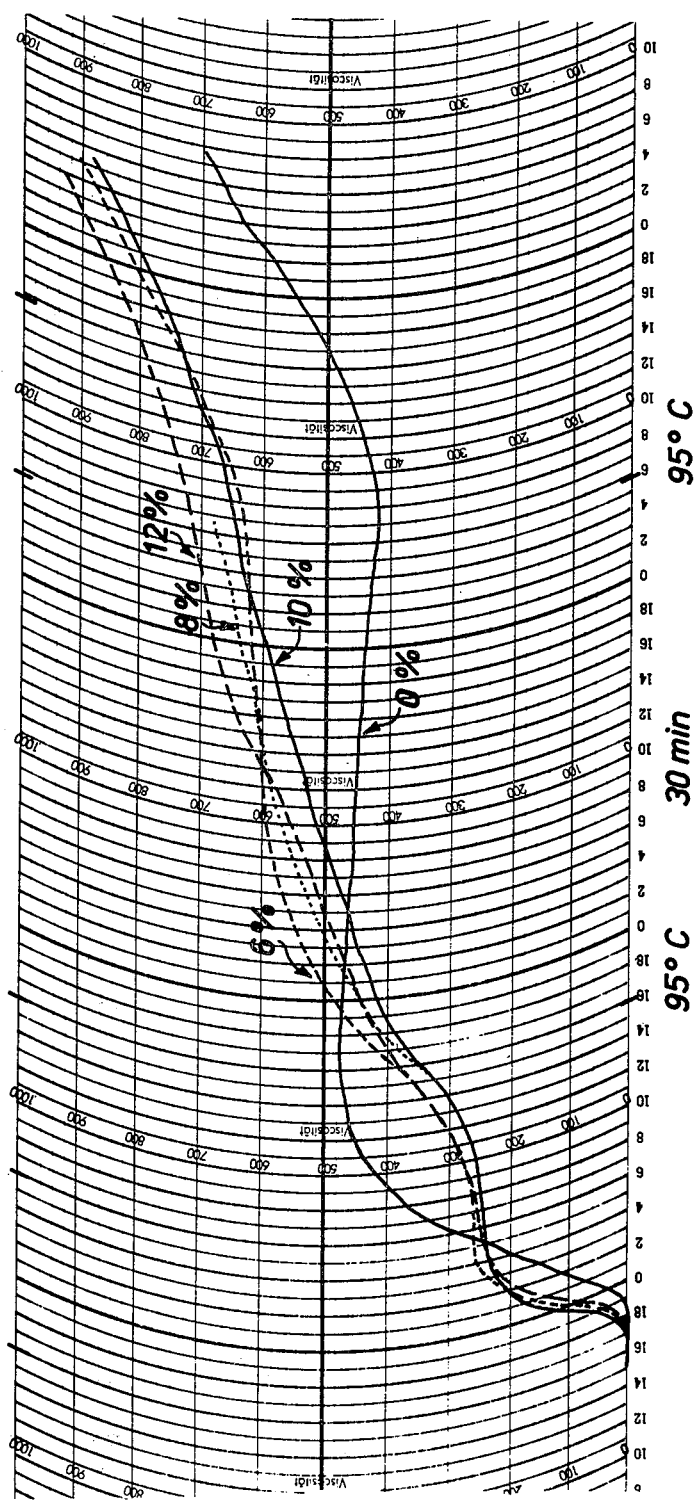
FIG. 7 graphically depicts the relation between viscosity and temperature.

The change in viscosity of each of (a) through (e) during the noted treatment is reflected in FIG. 7.

As demonstrated by the preceding Examples, gelation of starch can be completely avoided by incorporating anions, preferably polyvalent anions, e.g. phosphate ions (see Example 1), in the reaction medium. It is not possible, however, to avoid gelation or even to reduce the viscosity to any significant extent when a mixture of starch and milk powder (containing casein) is similarly treated. This is illustrated by FIG. 7, which shows the effect of different percentages of milk powder on 4 percent by weight dispersions of potato starch. Milk powder contains about 30 percent by weight of casein and 53 percent by weight of lactose. As is commonly known, lactose has a retarding effect on the swelling of starch grains. FIG. 7 confirms that swelling is retarded initially, but milk-powder mixtures rapidly reach a thicker consistency than pure starch. When caseinate, rather than milk powder (containing casein), is combined with starch in corresponding systems, the viscosity decreases with increasing caseinate concentration, and gelation is completely avoided when 4 percent by weight of caseinate (corresponding to 13 percent by weight of milk powder) is combined with 4 percent by weight of starch.

EXAMPLE 12

Figure 10:
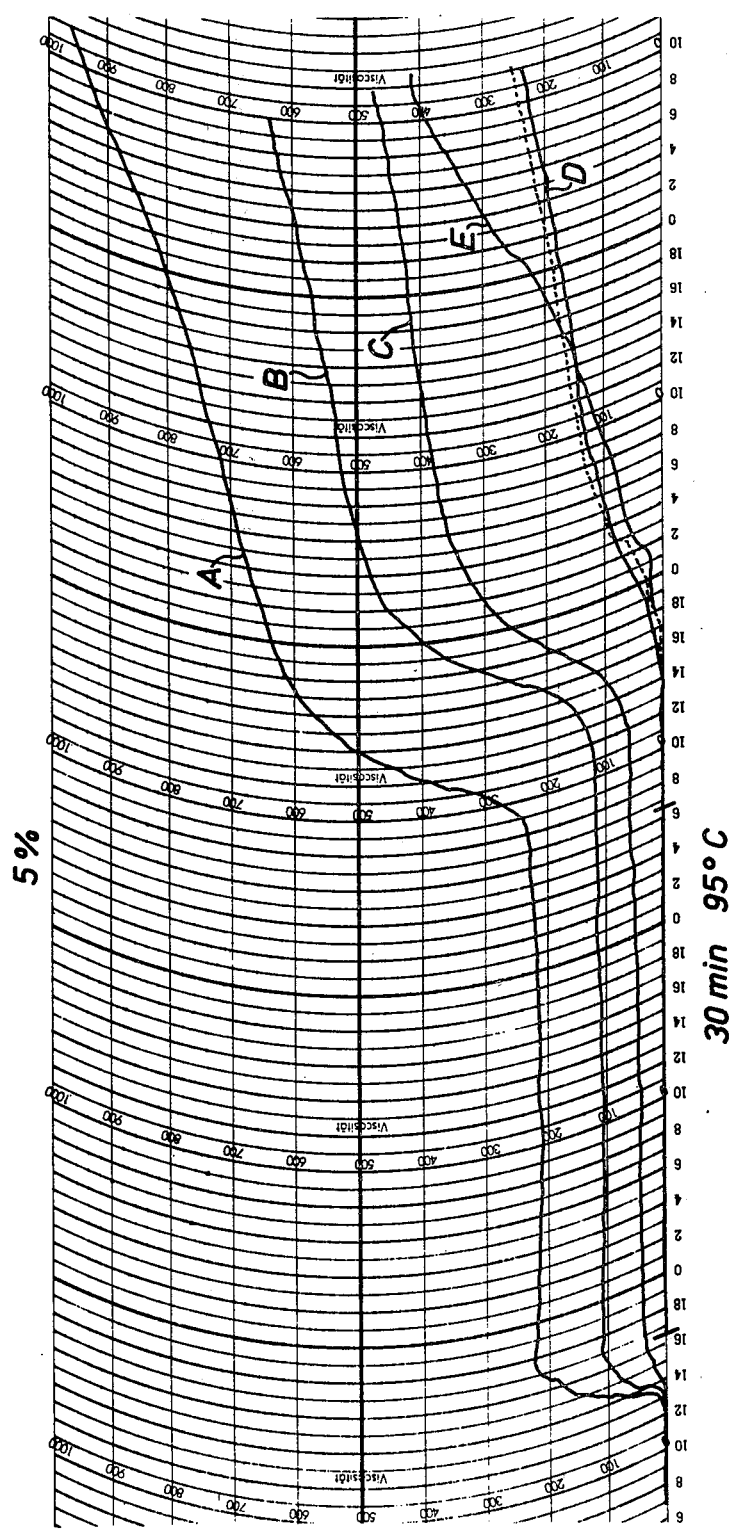
FIG. 10 graphically depicts the effect of different starch-caseinate ratios on viscosity.

In order to illustrate further the effect of starch-caseinate ratios on viscosity, the following procedure is adopted. Make caseinate dispersions in 0.1 M phosphate buffer at pH 7.0 of the following concentrations by weight: 0%, 1%, 2%, 4%, 6%. Add 5% corn-starch to each dispersion. Heat in a Brabender Amylograph at a rate of 1.5° C./min. to 95° C. After a holding time of 30 min. at 95° C. cool the dispersion at a cooling rate of 1.5° C./min. The effect of caseinate concentration on the viscosity can be seen in FIG. 10, wherein the curves designated A, B, C, D, and E relate to the concentrations 0%, 1%, 2%, 4%, and 6% caseinate, respectively. The viscosity is decreased by increasing caseinate concentration to a concentration of 4%, where the gelation is completely suppressed.

EXAMPLE 13

In order to illustrate the effect of various salts on the viscosity of modified starch dispersions, the following procedure is adopted:

Make a 5% corn-starch dispersion in 0.1 M phosphate buffer at pH 7. For the composition of the buffer, see below.

Make 4% caseinate dispersions at pH 7 in the following solutions:
(a) No salt, distilled water
(b) 0.2 M NaCl
(c) 0.1 M phosphate buffer
(d) 0.019 M citrate
(e) 0.019 M phosphate
(f) universal buffer Add 5% corn-starch to the caseinate dispersions.

Composition of buffers:

Phosphate at pH 7: 610 ml 0.1 M $Na_2HPO_4$ + 390 ml 0.1 M $NaH_2PO_4$

Universal buffer: 1 liter solution is made which contains 6.008 g citric acid, 3.893 g $KH_2PO_4$, 1.769 g $H_3BO_3$ and 5.266 g Barbitol. 0.2 M NaOH is added to the solution until the desired pH is obtained (approx. 1,000 ml NaOH to 2,000 ml solution).

Figure 11:
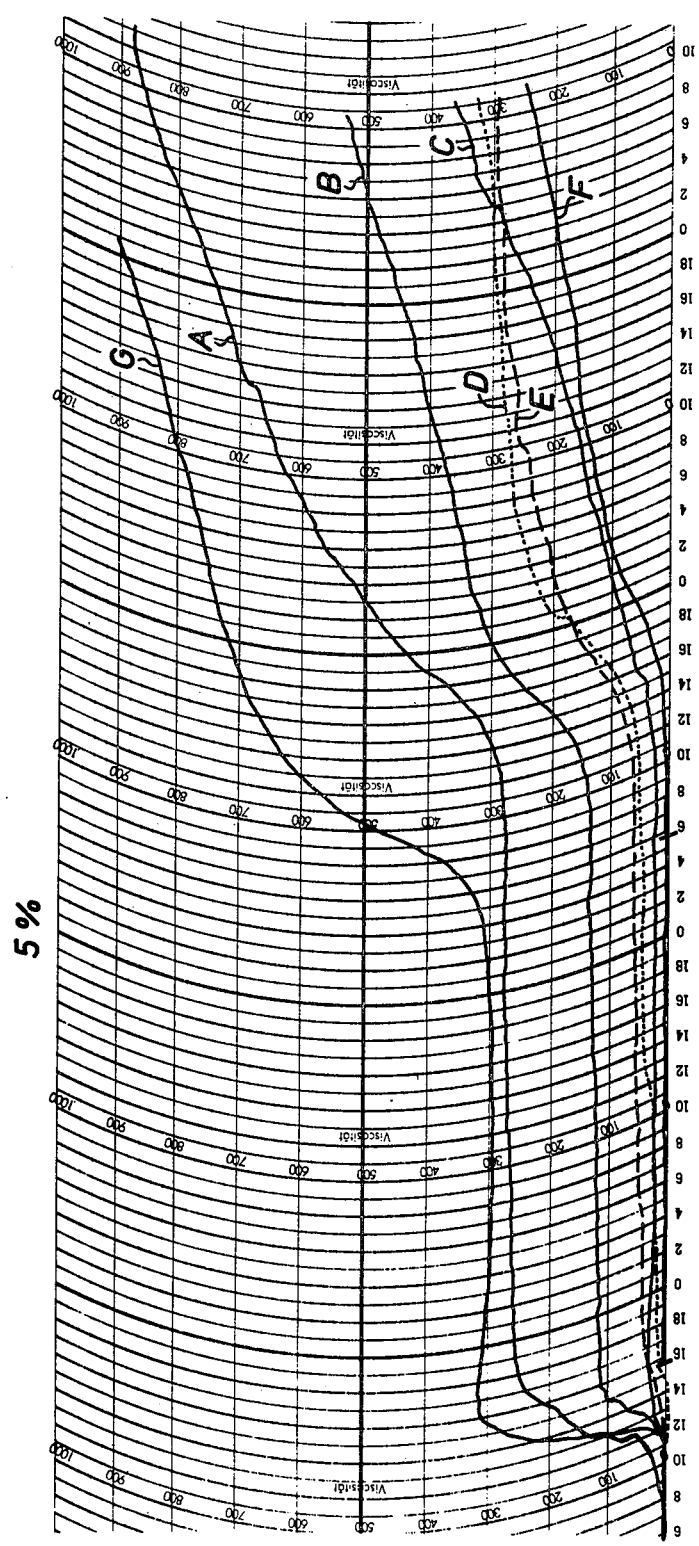
FIG. 11 graphically depicts the effect of various salts on viscosity.

The dispersions are heated at a rate of 1.5° C./min. to 95° C., held at 95° C. for 30 min. and then cooled at a rate of 1.5° C./min. The result is shown in FIG. 11 wherein curves A to F relate to dispersions a to f, respectively, defined above, and curve G relates to the 5% pure corn starch dispersion.

It is seen that the effect of complex formation on viscosity is small in the absence of salt. The strongest effects are obtained in the presence of polyvalent ions.

EXAMPLE 14

For making a stabilized emulsion of animal fat, potato starch is added to a 4% caseinate dispersion at a starch-protein ratio of 4:1. No salt is added. The dispersion is heated to 95° C. for 10 min., roller-dried and ground.

EXAMPLE 15

For the same purpose as in Example 14 potato starch is added to a 4% caseinate dispersion made in a 0.2 M NaCl solution. The starch/protein ratio is 4:2. The mixture is heated to 90° C. for 10 min., roller-dried and ground.

The products made according to the procedures in Examples 14 and 15 are tested for emulsion stability in the following way:

Starch-casein complex, pork fat and water in a ratio of 1:6:6 are mixed in a turbomixer at high speed. The emulsion thus obtained is sealed in a can and cooked for 30 min. After cooling the cans are opened and the fat and water release measured. No fat or water release was obtained when the two casein-starch complexes were tested. For reference native starch and caseinate were mixed in the above described proportions without complex formation. In this case a substantial fat and water release of the heat-treated emulsions was observed. This procedure gives information on how the fat will be stabilized in a meat emulsion.

The invention and its advantages are apparent from the preceding description. Various changes may be made in the process, the actual ingredients employed and the resulting modified starch (complex) without departing from the spirit and scope of the invention or sacrificing its material advantages. The process and products hereinbefore described are merely illustrative of preferred embodiments of the invention.

What is claimed is:

1. A protein/starch complex having (a) protein in the form of casein or caseinate and (b) a protein/starch weight ratio of from 1:20 to 3:2.
2. A complex according to claim 1 wherein the starch is root-derived starch.
3. A complex according to claim 2 wherein the root is cassava, potato or arrowroot.
4. A complex according to claim 1 wherein the starch is seed-derived starch.
5. A complex according to claim 4 wherein the seed is corn, wheat, waxy maize, sorghum or rice.
6. A complex according to claim 1 wherein the starch is stem-derived starch.
7. A complex according to claim 6 wherein the stem is sago.
8. A complex according to claim 1 wherein the protein/starch weight ratio is from 1:4 to 4:3.
9. A complex according to claim 1 having emulsion-stabilizing properties.
10. A complex according to claim 1 having a reduced degree of gel structure and of thixotropy as compared with those of non-complexed starch.
11. A salt-containing complex according to claim 1.
12. A polyvalent-ion-containing complex according to claim 1.
13. A process which comprises complexing starch with casein or caseinate by heating them together in an aqueous reaction medium at a temperature above the starch-gelation temperature for a period which is inadequate to cook the starch.
14. A process according to claim 13 wherein the reaction medium comprises ions and the heating temperature is not in excess of the reaction medium boiling temperature.
15. A process according to claim 14 wherein the anions are polyvalent.
16. A process according to claim 13 which comprises dispersing the casein or caseinate in water before adding starch thereto and heating.
17. A process according to claim 13 wherein the complexing is obtained in a texturing procedure.
18. A process according to claim 17 wherein the texturing procedure comprises extrusion.
19. A process according to claim 17 wherein the texturing procedure comprises spinning.
20. A process according to claim 13 wherein the ratio of the amount of starch to that of casein or caseinate is sufficient to produce a product wherein the protein/starch ratio is within the range of from 1:20 to 4:1.

* * * * *